Figure 1:
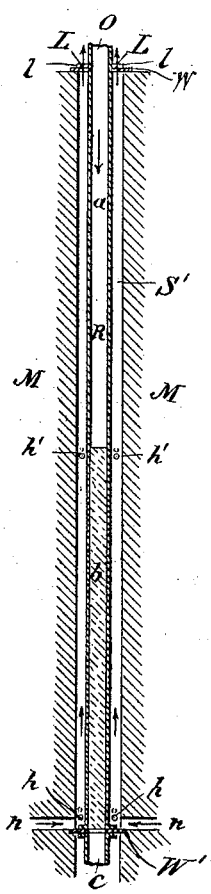

No. 688,020. Patented Dec. 3, 1901.
R. KNIETSCH.
APPARATUS FOR THE MANUFACTURE OF SULFURIC ANHYDRID.
(Application filed Oct. 31, 1899.)
(No Model.) 9 Sheets—Sheet 1.

WITNESSES:
O. N. Raymond
H. L. Reynolds.

INVENTOR
Rudolf Knietsch
BY Giffrid & Bell
ATTORNEYS.

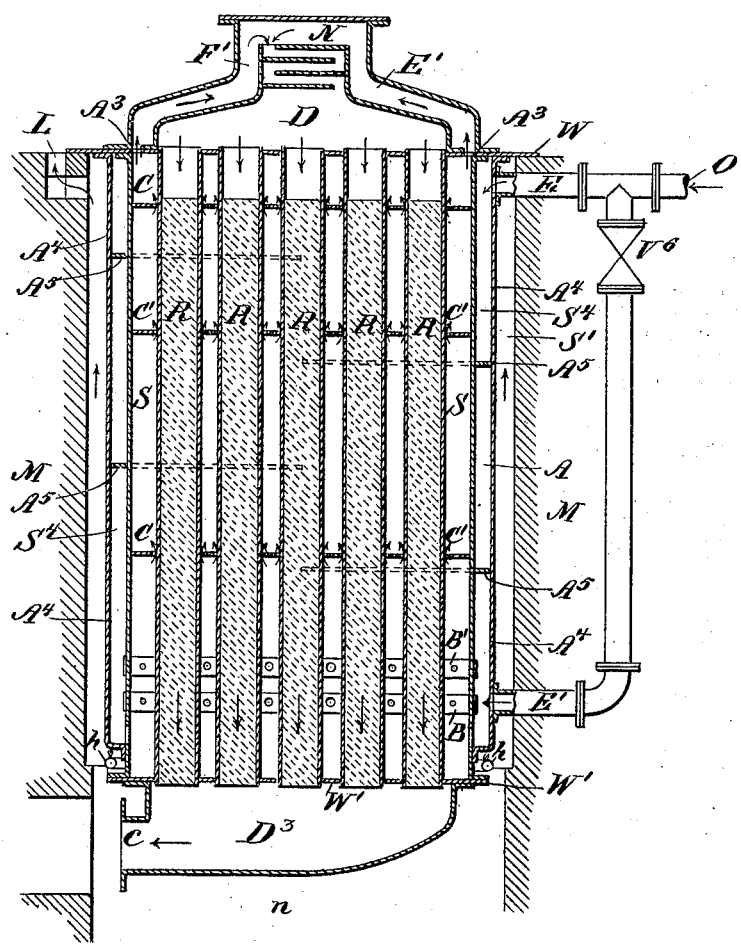

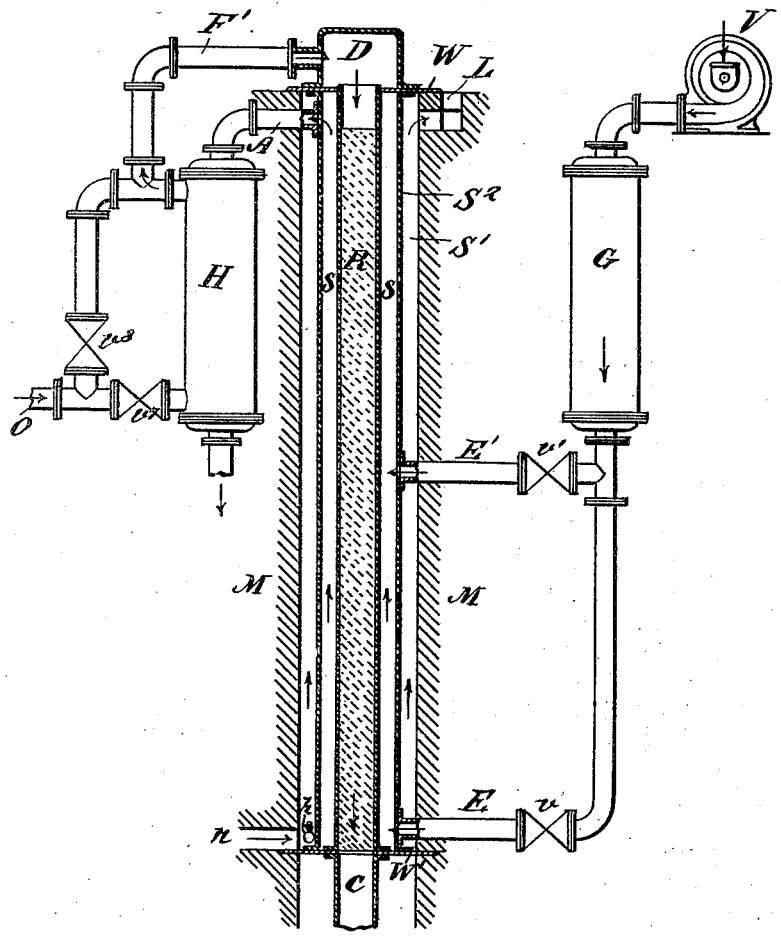

No. 688,020. Patented Dec. 3, 1901.
R. KNIETSCH.
APPARATUS FOR THE MANUFACTURE OF SULFURIC ANHYDRID.
(Application filed Oct. 31, 1899.)
(No Model.) 9 Sheets—Sheet 6.
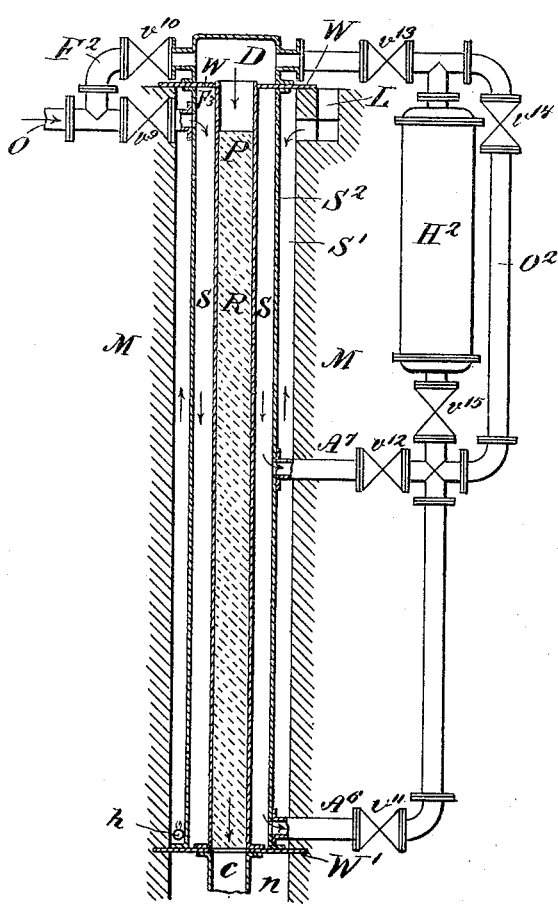
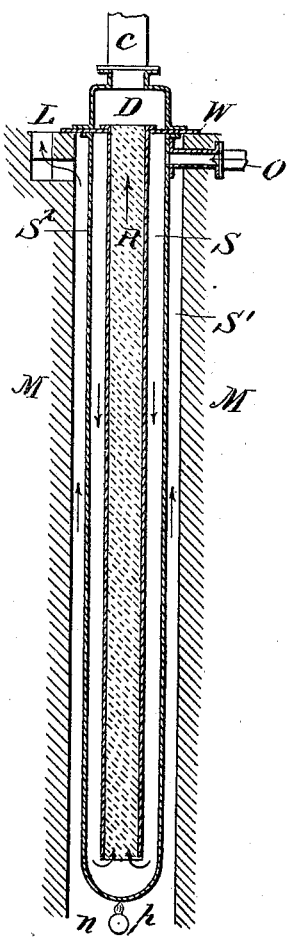

No. 688,020. Patented Dec. 3, 1901.
R. KNIETSCH.
APPARATUS FOR THE MANUFACTURE OF SULFURIC ANHYDRID.
(Application filed Oct. 31, 1899.)

(No Model.) 9 Sheets—Sheet 7.

WITNESSES:

INVENTOR

BY

ATTORNEYS

No. 688,020.  
Patented Dec. 3, 1901.  
R. KNIETSCH.  
APPARATUS FOR THE MANUFACTURE OF SULFURIC ANHYDRID.  
(Application filed Oct. 31, 1899.)
(No Model.)  
9 Sheets—Sheet 8.
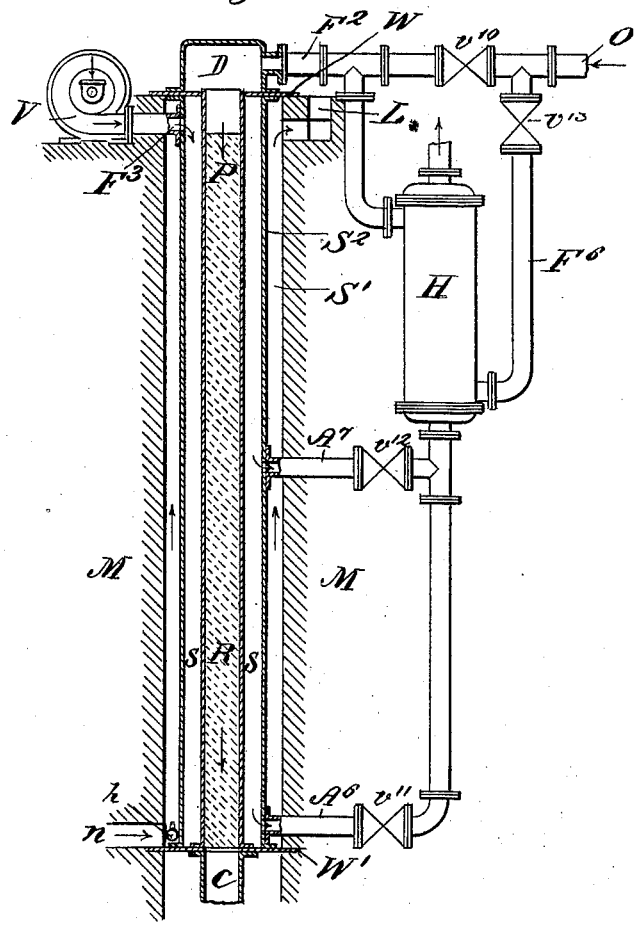
WITNESSES:
INVENTOR No. 688,020. Patented Dec. 3, 1901.
R. KNIETSCH.
APPARATUS FOR THE MANUFACTURE OF SULFURIC ANHYDRID.
(Application filed Oct. 31, 1899.)
(No Model.) 9 Sheets—Sheet 9.

WITNESSES:
D. H. Hayward.
H. L. Reynolds.

INVENTOR
Rudolf Knietsch
BY Gifford & Bull
ATTORNEYS

UNITED STATES PATENT OFFICE.

RUDOLF KNIETSCH, OF LUDWIGSHAFEN, GERMANY, ASSIGNOR TO THE BADISCHE ANILIN- & SODA-FABRIK, OF LUDWIGSHAFEN, BAVARIA, GERMANY, A CORPORATION OF GERMANY.

APPARATUS FOR THE MANUFACTURE OF SULFURIC ANHYDRID.

SPECIFICATION forming part of Letters Patent No. 688,020, dated December 3, 1901.

Original application filed July 14, 1898, Serial No. 685,969. Divided and this application filed October 31, 1899. Serial No. 735,368. (No model.)

*To all whom it may concern:*

Be it known that I, RUDOLF KNIETSCH, doctor of philosophy, a subject of the King of Prussia, German Emperor, residing at Ludwigshafen-on-the-Rhine, in the Kingdom of Bavaria and Empire of Germany, have invented new and useful Improvements in Apparatus for the Manufacture of Sulfuric Anhydrid, of which the following is a specification.

It is well known that when sulfur dioxid is combined with oxygen to form sulfuric anhydrid a considerable amount of heat is evolved. This is stated in literature to be in accordance with the equation $$SO_2 + O = SO_3 + 32.2 \text{ calories}.$$

(See Hess, *Poggendorf's Annalen* Vol. 56, page 471, 1842; Thomsen, *Annalen der Chemie und Pharmacie* 4, Vol. 30, page 442, 1873; Ostwald, *Allgemeine Chemie*, 2d edition, Vol. 2, pages 123 and 124.) The reaction between sulfur dioxid and oxygen only takes place at an elevated temperature, so that it is necessary to submit the gases either separately or in admixture to a preliminary heating. Such heat was applied by exposing the tubes to a low red heat maintained in a surrounding heated chamber from a furnace, as shown in Rath's German Patent No. 22,118 of 1883, or in Ellice-Clark's English Patent No. 3,166 of 1888, or in Haenisch and Schroeder's United States Patent No. 384,841, of 1888, or in Starck's English Patent No. 12,028 of 1889. During the reaction the heat of chemical union becomes added to that applied, and thus the temperature at the zone of maximum reaction may rise to a high degree, even to a bright-red heat, according to the richness in sulfur dioxid of the gas mixture or to the strength of the current of the gases, or both. It has long been known that the low percentage in yield of $SO_3$ was the obstacle preventing the commercial success of the contact method, and various causes have been suggested for this low percentage, such as the nature of the contact material or the presence of diluting gases; but it remained for me to discover that the high temperature above referred to was the true cause and to provide the hereinafter-described apparatus based upon such discovery as a remedy for the difficulty. By an apparatus regulating the temperature of the contents of the chamber containing the contact substance in such manner as to substantially avoid the presence therein of excess of heat due to the reaction I attain a condition of temperature in the contact-chamber which is within wide limits independent of the quantity and richness of the gas mixture treated and by which it is possible to obtain a practically quantitative yield of sulfuric anhydrid to a degree comparable with the action in the sulfuric-acid chambers, particularly when the apparatus also restrains the zone of maximum reaction against movement away from the first portion of the contact substance and maintains a decreasing temperature from this zone to the latter portion of the contact substance. This approximately quantitative yield is also accompanied by other advantages, such as the preservation of the iron parts of the apparatus against destruction by oxidation, as well as the preservation of the contact substance against weakening. In this apparatus platinized asbestos is the contact material recommended for use. It can, for instance, be prepared as described in the specification of Winkler's German Patent No. 4,566. (See also Lunge's *Sulphuric Acid and Alkali*, 2d edition, Vol. 1, page 863, and Dammer, *Chemische Technologie*, Vol. 1, page 189.) With the receptacle containing the contact material I combine a holder whereby a cooling medium is held in such proximity to the contact material that the excess of heat generated by the reaction is removed. The temperature of this cooling medium is below the decomposing temperature of the sulfuric anhydrid being formed, and the apparatus is provided with means which enable the accurate and prompt control of the capacity of said cooling medium for absorbing said excess of heat either by regulating the volume or temperature, or both, of the same.

My new apparatus can be varied in many respects. In its use particular regard must be had to the richness of the gases to be treated. I generally construct the apparatus so as effect the cooling of the contact-chamber, so as to produce the most favorable range of temperature therein, by means of a current of gas held in close contact with the contact-material receptacle by a surrounding inclosure. Both the rate of flow and the temperature of this current are kept under control. I use, for instance, air in this way or the actual gases which are to be treated themselves; but the cooling can be effected in other ways—for instance, in liquid-baths, especially molten-metal baths, whose temperatures are under control. When the apparatus is so constructed that the gases to be treated are themselves used for cooling the contact-chamber, a part or the whole of the current of gases so to be treated is caused to pass through the space exterior to the chamber containing the contact substance, so as to withdraw from the latter the excess of heat due to the reaction. The gases coming from the cooling-chamber are thus in some cases brought to the temperature best suited for the most favorable course of the reaction, and in other cases a further heating or a cooling operation is necessary. This depends largely upon the richness of the gases.

In the preferred embodiment of this apparatus the excess of heat due to the reaction is removed from the converted gas as it is passing through the reaction-chamber by the absorption of such heat in the gas which is about to be converted by causing the whole or a portion of the gas about to be converted to be passed within heat-absorbing proximity to the converted gas while said converted gas is in the course of its passage through the contact-chamber, whereby the maximum temperature within the contact-chamber is restricted substantially between the limits of composition and decomposition of sulfuric anhydrid.

I describe my apparatus in various forms in the following typical examples, having reference to the drawings.

Figure 2:
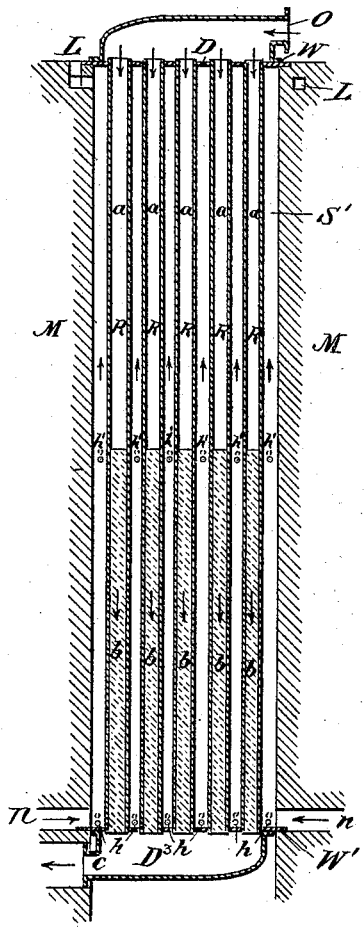
Figure 3:
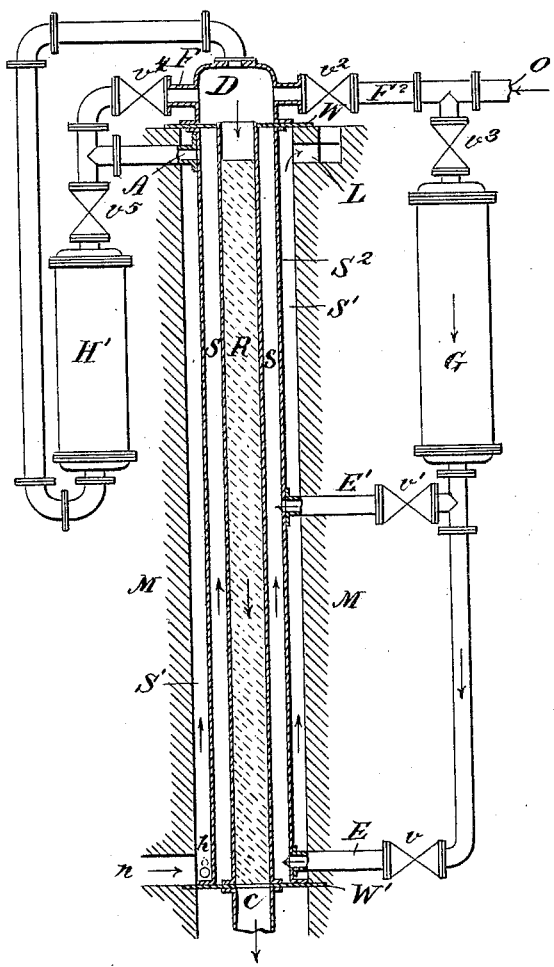
Figure 4:
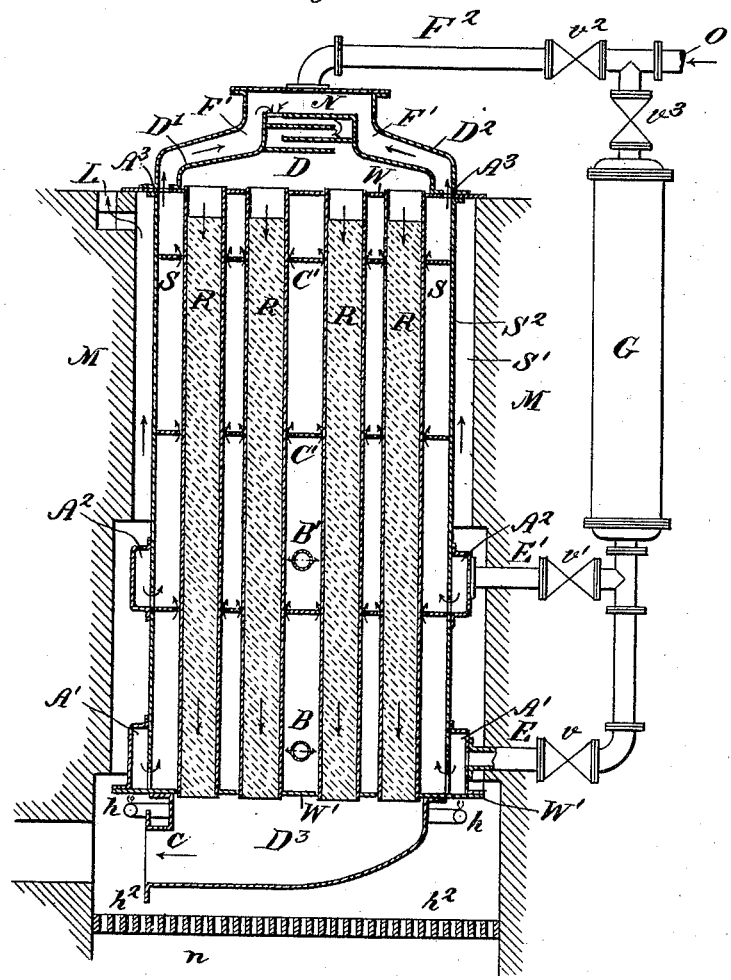
Figure 8:
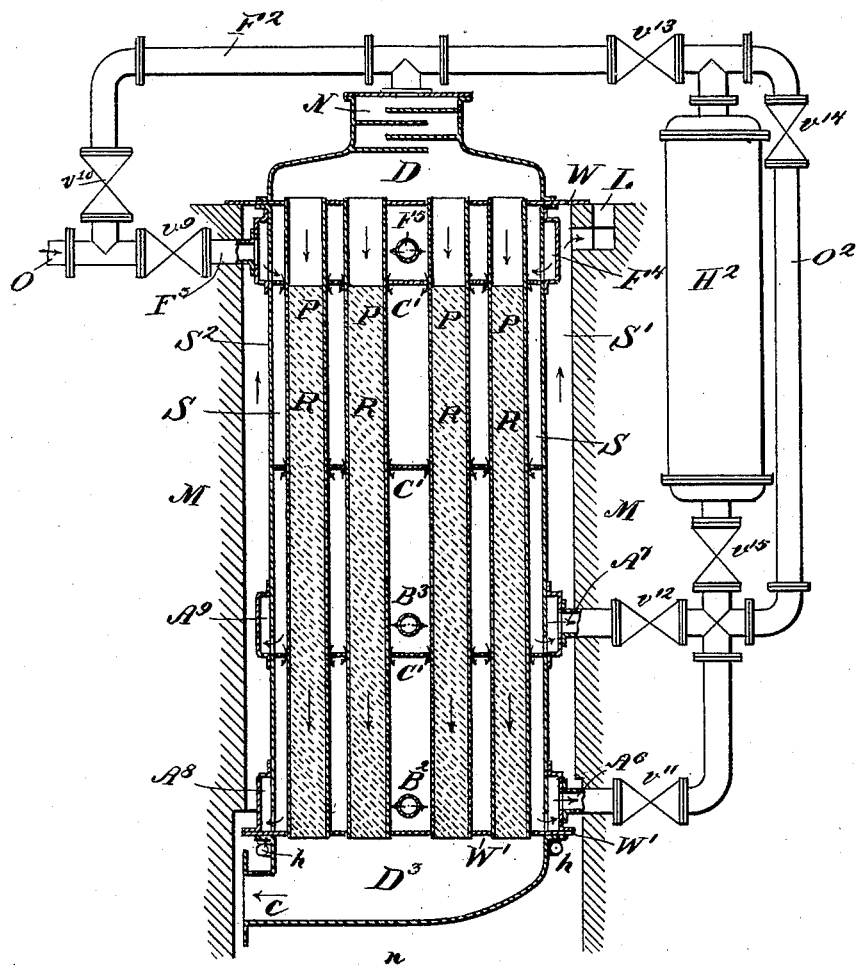
Figure 11:
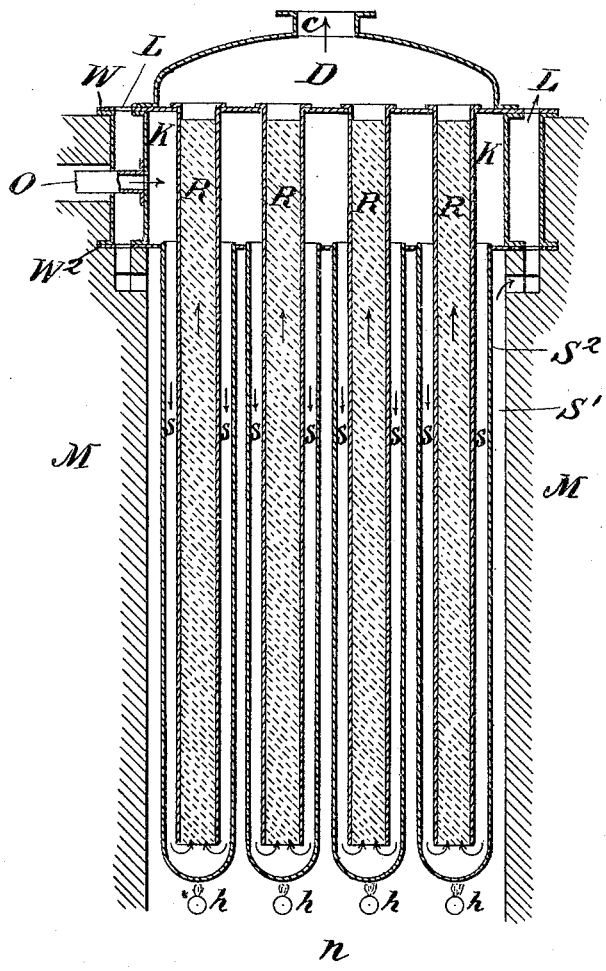

Figure 1 represents, in vertical section, a form of apparatus in which a single contact-tube is employed and in which the excess of heat due to the reaction is removed by a current of air. Fig. 2 represents the same, with the exception that it contains a plurality of contact-tubes. Fig. 3 represents an elevation, partly in section, of an apparatus in which a single contact-tube is employed in which the excess of heat due to the reaction is removed by a current of gas containing sulfur dioxid and oxygen on its way to the ingress end of the contact-tube. Fig. 4 is an elevation, partly in section, of an apparatus in which there is a plurality of contact-tubes and in which the excess of heat due to the reaction is removed by a current of gas containing sulfur dioxid and oxygen on its way to the ingress ends of the tubes, and which apparatus contains additional means for distributing such current along and against the outside of the contact-tubes and for mixing the same preparatory to its entrance into the contact-tubes. Fig. 5 is an elevation, partly in section, of an apparatus containing a plurality of contact-tubes and in which the excess of heat due to the reaction is removed by the current of gas containing sulfur dioxid and oxygen on its way to the ingress ends of the contact-tubes, and which apparatus is provided with particular means for directing said current. Fig. 6 represents an elevation, partly in section, of another form of apparatus containing a single contact-tube and in which the excess of heat due to the reaction is removed by a current of air and then transferred to the current of gas containing sulfur dioxid and oxygen on its way to the ingress end of the contact-tube. Fig. 7 is an elevation, partly in section, of an apparatus containing a single contact-tube and in which the excess of heat due to the reaction is removed by a current of gas containing sulfur dioxid and oxygen on its way to the ingress end of the contact-tube, which current passes in the same direction both adjacent to the outside and on the inside of said tube and not inversely, as in the preceding figures. Fig. 8 is a similar apparatus, excepting that it contains a plurality of contact-tubes and additional means for distributing, deflecting, and mixing the current of gas containing sulfur dioxid and oxygen. Fig. 9 is an elevation, partly in section, of an apparatus similar to that shown in Fig. 7, excepting that the excess of heat due to the reaction is removed by a current of air from which said heat is transferred to the current of gas containing sulfur dioxid and oxygen on its way to the ingress end of the contact-tube. Fig. 10 is a vertical section of another form of apparatus containing a single contact-tube, in which the excess of heat due to the reaction is removed by a current of gas containing sulfur dioxid and oxygen on its way to the ingress end of the contact-tube. Fig. 11 is a vertical section of an apparatus similar to the last excepting that it contains a plurality of contact-tubes.

In all of the above figures certain corresponding parts are lettered as follows:

M is an inclosure, which may consist of brickwork or of other suitable material.

R is the contact chamber or chambers, shown in the form of a tube or tubes supported at one end by the tube-plate W and in most of the figures at the other end by the tube-plate W'.

S' is an air-passage surrounding the contact tube or tubes from end to end and having an inlet $n$ at one end and an outlet L at the other end.

$h\ h$ are means of heating the air-current at or near the entrance end of the passage S', which heating means should be capable of prompt extinction, lighting, and regulation, such as gas-flames or their equivalents. The current of air in the passage S' may serve as a medium for heating to start the reaction and as a medium for cooling or regulating the temperature while the reaction is in progress.

S in the figures where it appears is a passage surrounding the contact tube or tubes R, by which passage the gas containing sulfur dioxid and oxygen is conducted and held in contact with the tube or tubes R from end to end on its way to the ingress end of the said tube or tubes.

$S^2$ is a tube secured to the tube-plate W, whereby the passages S and S' are separated.

c is a passage by which the sulfuric anhydrid is received at the egress end of the contact tube or tubes R and conducted away from the apparatus.

O is a pipe leading to the apparatus from a source of a mixture of gas containing sulfur dioxid and oxygen.

$v\ v'\ v^2\ v^3\ v^4$, &c., are hand-valves of ordinary construction for closing or partially closing the pipes in which they are respectively placed, whereby the operator is enabled to cut off or regulate the current of gas containing sulfur dioxid and oxygen or of air, as the case may be.

G is a heater of any suitable construction adapted for heating the gas containing sulfur dioxid and oxygen or air passing through it.

H is a heat-interchanger by which the air which has cooled the contact substance is conducted adjacent to the gas containing sulfur dioxid and oxygen on its way to the ingress end of the contact tube or tubes, so that the gas containing sulfur dioxid and oxygen may be heated by the excess of heat due to the reaction extracted by the air from the contact substance. By placing the contact substance in the tube or tubes R, which upon removal of the cover, as D, are open at the top, the tubes may be charged with the contact substance dropped in at the top, so that, as indicated by the broken lines in the figures, it will extend substantially across the opening through the tube R. It thus forms an obstruction or an impediment through which the gases are obliged to pass and which by reason of the tubular form of the receptacle R containing it and also by reason of its lying substantially against the walls of said tube, which walls are cooled by the current adjacent thereto on the outside, presents conditions for effecting the uniform cooling of the contact substance. This result is further facilitated by the fact that the passage S is formed by the combining with said tube or tubes R of the inclosure $S^2$ in a form by means of which each tube R is substantially jacketed by the cooling-current, and the thin walls $S^2$ of which (where the cooling-current consists of the gases to be treated) permit the heat transfer, which enables the air-current in the passage S' to assist as an efficient temperature-regulator. In those forms of the apparatus wherein the gas to be treated is employed as the cooling-current the branches of the pipe O leading, respectively, to the passage S and to the cover D, with their valves $v\ v'\ v^2$, &c., enable the operator to so apportion the current entering the cover D between that which is heated and that which is unheated as to greatly assist in maintaining the desired temperature of the gases when they enter the contact substance, and so to secure the greatest efficiency.

In Fig. 1, M represents a structure of brickwork or other suitable material. Within this a pipe R is fixed, leaving the passage S' between. This pipe R consists of two parts $a$ and $b$, which have different functions and may differ from one another in length and diameter; also, either part can be replaced by a plurality of narrower pipes. The portion $b$ of the pipe R is occupied by the contact substance, (indicated in the drawings by broken section-lines,) and this is cooled by the cold air entering S' at $n$. In the other part $a$ of the pipe R the gases containing the sulfur dioxid, which enter at O, are heated to the temperature necessary for the reaction.

When commencing the operation, the whole apparatus is first raised to the temperature necessary for the reaction by heating by means of $h\ h$—say gas-flames. Then when rich gases are used after the reaction has once commenced further heating of the apparatus is unnecessary, because the air as it passes through the structure M in contact with that part $b$ of the pipe R in which the reaction is in progress in extracting the excess of heat due to the reaction absorbs heat and then transfers sufficient heat to the other portion $a$ to prevent a change of position of the reaction zone or the entire cessation of the reaction. The current of air can be regulated by means of the updraft-openings L L, which are adjustable by the slides $l\ l$. It is regulated in such a way that the contact mass in $b$ is constantly maintained at the most favorable temperature for the reaction. When the gases contain but little sulfur dioxid, the air which is somewhat heated by its cooling action on the contact substance is further heated by suitable means $h'\ h'$, (such as gas-flames,) so that the gases flowing in through part $a$ receive a greater increment of heat. When the gases are still poorer in sulfur dioxid, it may be necessary to continually heat to some extent the current of air flowing in through $n$ either by means of the gas-flames at $h\ h$ or in some other way. The gases containing the sulfuric anhydrid, issuing from the contact-chamber $b$, leave the apparatus by the pipe $c$ and are worked up in any suitable way.

In Fig. 2 an apparatus is represented made up of a plurality of contact-tubes R R, which are in connection with one another by means of the two tube-plates W W' and the covers D $D^3$ above and below. In other respects it resembles Fig. 1.

In Fig. 3 within brickwork M a tube $S^2$ is fixed to the tube-plates W W'. It contains the tube R, extending through or registering with openings through the tube-plates, which close the ends of the space between said tubes R and $S^2$. The apparatus is brought to the reaction temperature from any source of heating—for instance, the gas-flame $h$—the gases from which can pass away through the flue L. When the reaction is in progress, the source of heat $h$ can usually be extinguished and unheated air be allowed to circulate through the passage $S'$, thus contributing to the cooling of the whole apparatus. The gases to be treated are passed through the entrance-passages E or $E'$ or E and $E'$ into the passage S. The valves $v$ and $v'$ enable the operator to utilize either or both passages. The temperature of the said gas to be treated can be further regulated by a heating apparatus G. This gas cools the contact substance in R and passes on through the openings A and F and the mixing-chamber formed by cover D into the contact substance in the pipe R. The treated gas issues through $c$. The temperature of the gas can also be regulated before entering D by closing the valve $v^4$ and opening the valve $v^5$, so that the current must pass through the temperature-regulator $H'$. By closing or partially closing valve $v^3$ and opening valve $v^2$ the gas mixture to be treated can be made in whole or in part to enter the contact chamber or tube through passage $F^2$ without passing through the passage S.

In Fig. 4 a plurality of pipes R are coupled up in one common apparatus. I find the form of apparatus illustrated in Fig. 4 of great practical use, and therefore further describe it. I have found that in large apparatus containing many pipes it is advisable to arrange that the current of gas in the passage or chamber S be thoroughly subdivided. This is effected in the first place by the aid of the gas-chambers $A'$ $A^2$, which serve to introduce the gas into the pipe $S^2$ around its entire circumference. Further, by the use of tubes B $B'$, passing diametrically through $S^2$ and furnished with holes at the sides, varying in size in proportion to the section of the circle corresponding thereto, the gas is divided up in a uniform way in the interior of the chamber S. In order that the cooling-gas may retain the direction of its current and pass as near as possible to the contact substance, I further insert at intervls, which must be not too great, a number of baffles $C'$ $C'$ $C'$, which are arranged within the chamber S in such a way that in passing them the gases are compelled to pass close by the walls of the tubes R R. Further, it is desirable to thoroughly mix the gases before their entrance into the contact substance in order to equalize their temperature. The mixing apparatus N serves this purpose. The cover D is made of two parts $D'$ and $D^2$, with the mixer N placed in the opening at the center of $D'$, through which the gases must pass in proceeding from the openings $A^3$, located at the end of chamber S outside the series of tubes R, inwardly through the passages $F'$, and downwardly to the ingress ends of the tubes R. The air-passage $S'$, with the gas-flames $h$, by which the temperature of the air in the passage S may be promptly regulated, are present, as in Fig. 3. The strength of the current and the temperature of the cooling-gases are regulated upon the basis of the readings of the thermometers in the various parts of the apparatus and especially within the covers D and $D^3$. This regulation should be continued until analyses of the gases entering and leaving the apparatus show that the most favorable practical result is being obtained. $h^2$ $h^2$ represent a gas-burner whereby I heat the chamber $D^3$, through which the gases pass away from the egress ends of the contact-tubes in order to maintain such a temperature that the said outgoing gases will not attack the material of the apparatus. This gas-burner can also be used, in the first instance, for heating up the whole apparatus.

In Fig. 5 is shown a form of apparatus in which the gas-distribution chambers (corresponding with those marked $A'$ $A^2$ in Fig. 4) are extended to form a jacket $A^4$ to the whole apparatus, thus utilizing the radiant heat of the apparatus to heat the cooling-gases. The said jacket is shown as being provided with baffle-plates $A^5$ for giving a circuitous course to the gases. In this form the gas mixture to be treated entering at E passes downward through the jacket-passage $S^4$, thence into the pipes B and $B'$, by which it is distributed in the chamber S, and then pursues the same course as in Fig. 4. A portion of the gas mixture may, however, be introduced into the jacket-passage at the bottom by opening valve $v^6$.

In Fig. 6 is shown a form of apparatus in which the cooling-stream of air or gas is caused by a ventilator or fan V to stream through G and E $E'$ into S. This current cools the tube R and leaves S by A. The heat of the gas issuing at A can be used in any way desired—for instance, by transferring it to the cold gases to be treated in a suitable apparatus H, which gases can be passed in whole or in part through the heat-interchanger H by the operation of the valves $v^7$ $v^8$.

In Figs. 7 and 8 I illustrate a further typical form of apparatus which is particularly suited for use when treating gas mixtures rich in sulfur dioxid. The current of gas coming through O is led through $F^3$ to the hottest part P of the contact substance in R. In this way the relatively coldest gas is brought to act upon the hottest part of the contact substance and energetically cools this. The cooling-gas current can leave the passage S through $A^6$ or $A^7$ or through $A^6$ and $A^7$ and can then be conducted either directly through $O^2$ to D or through the cooler $H^2$ to D or through $O^2$ and $H^2$ to D, thereby having its temperature regulated. Also a portion of the gas can be led at the same time direct through F² to D. All of this regulation can be effected by the valves $v^9$ $v^{10}$ $v^{11}$ $v^{12}$ $v^{13}$ $v^{14}$ $v^{15}$. Fig. 8 differs from Fig. 7 in the addition of a plurality of tubes R and baffle-plates C' in the passage S; also, the circumferential passage F⁴ and transverse perforated pipe F⁵, whereby the gases from F³ are distributed in the passage S; also, the circumferential passages A⁸ A⁹ and transverse passages B² B³, whereby the gases entering the passages A⁶ A⁷ are taken from the passage S at various points; also, the mixer N in the cover D. Here also the regulation of the current of gas is based upon gas analyses and readings of thermometers.

In Fig. 9 air or other gas can be used for cooling instead of the gases to be treated. This is especially desirable when rich gases are to be treated, for their volume and quantity are comparatively small and might not be sufficient to cool efficiently. The cooling-current of air or gas is blown by a fan or ventilator V to the hottest part of the contact substance and streams through S. It cools the contact substance and leaves the apparatus by A⁶ or A⁷. The heat contained therein can be used in any way desired—for instance, for heating up the gases to be treated entering by F⁶ in the heat-interchanger H, so that the reaction-zone P does not change its position.

In Fig. 10, in inclosure M, a pipe S², closed at the bottom, is fitted to a tube-plate W, and into this pipe projects a tube R, which extends through the tube-plate. The gas containing sulfur dioxid and oxygen enters the tubular pocket S² at the top and descends in the space S to the bottom of the pocket, where it enters the contact-tube R and ascends through the same, and the sulfuric anhydrid escapes through the cover D and passage c. The tubular pocket S² is surrounded by the upwardly-moving air-current in S', which may be heated by the gas-flame h below the pocket.

In Fig. 11 a plurality of tubes are used similar to that shown in Fig. 10, excepting that the tubular pockets S² extend through an additional tube-plate W², so as to form a box-like chamber K between the tube-plates W and W², into which the gas containing sulfur dioxid and oxygen passes from the pipe o on its way to the top of the tubular pockets S², and the space in K serves for the distribution of the entering gases. The gases stream through the space S and cool the contact substance in R. They can be heated further by the source of heat h or cooled by a stream of air regulated at L. The treated gases leave the apparatus through D and c.

In the drawings accompanying this application the scale may be taken as being about one-twentieth of real size; but of course the size of the tubes and the relative sizes of the various parts can be varied without departure from the invention.

Mode of procedure: In the above examples I have described various forms of my apparatus and different ways of using the same. I will now give a concrete example of a manner of proceeding in order to obtain as favorable a result as possible when taking the case of a mixture of gases containing about twelve per cent., by volume, of sulfur dioxid and a similar quantity of oxygen (the balance of the volume consisting, substantially, of an indifferent gas, such as nitrogen) and treating this mixture in the apparatus of Fig. 4. I heat the apparatus first—say with gas-burners $h^2$—until a thermometer shows a temperature at about the position of the letter D of about 300° centigrade. Then the source of heat is cut off, and I then pass the entire stream of gas into the apparatus at A'. The temperature within the cover D first rises. When it has reached a temperature favorable for the reaction, the upper valve $v^2$ is opened, so that a part of the gas enters directly through F². The gases entering and leaving the apparatus are analyzed to determine their contents of sulfur dioxid, and in this way the practical effect is determined. I regulate the temperature in the interior of the contact apparatus on the basis of the readings of the thermometers in D and D³ by so arranging the cooling-stream of gas and the intensity of current by means of the valves $v$, $v'$, $v^2$, and $v^3$, and the temperature, if necessary, with the aid of the heater G that the most favorable conversion of the gas into sulfuric anhydrid is achieved. In the above example I achieve this object by passing about two-thirds of the entire gas-current in at A' and one-third direct through F² into D, so that the temperature in D, which becomes uniform, owing to the action of the mixing-chamber N, is about 380° centigrade, while the thermometer in D³ indicates about 234° centigrade. In this actual case, taken from experimental practice on the factory scale, I effected a conversion of from ninety-six to ninety-eight per cent. of that theoretically possible while making from forty to fifty kilograms of sulfuric anhydrid per pipe R in twenty-four hours. The conversion can be increased to ninety-nine per cent. if the gas be permitted to remain longer in the presence of the contact substance. It will be noticed that in this actual case when once the reaction has started no external source of heat is employed for its continuation. The gases to be treated enter the apparatus at or about the ordinary temperature of the air. By their cooling action on the contact substance they absorb sufficient heat from it to raise their temperature to that necessary for the reaction, and the resulting gases, containing sulfuric anhydrid, on account of this cooling action leave the apparatus at a temperature of about 234°—that is, far below that at which reaction took place. These features—the cold entering gases, no external source of heat, and gases leaving the apparatus at a temperature considerably lower than that of the reaction—can all be accomplished by my apparatus. If weaker gases than those containing about twelve per cent., by volume, of sulfur dioxid be employed, a slight external heating of the cooling-gases may be desirable. Thus with gases containing from eight or down to, say, six per cent. sulfur dioxid it is recommended to heat them to a temperature of about 100° to 250° centigrade; but in such cases also the characteristics mentioned can be seen, namely: The temperature of the gases entering the apparatus is lower than that at which the reaction takes place in the apparatus, there is little or no further heating of the apparatus, and the gases leaving the apparatus possess a temperature below that at which the reaction took place.

I claim—

1. In an apparatus for the manufacture of sulfuric anhydrid by the contact process, in combination, with the contact material, a receptacle for the same containing ingress and egress openings and means whereby a cooling medium is maintained in relation to said contact material, substantially as described, whereby the excess of heat due to the reaction is removed from said contact material.

2. In an apparatus for the manufacture of sulfuric anhydrid by the contact process, in combination with the contact material, a receptacle for the same containing ingress and egress openings and means whereby a cooling medium is maintained in relation to said contact material substantially as described, whereby the temperature at the hottest part of the contact-chamber is maintained between the composing and decomposing temperatures of the sulfuric anhydrid being formed.

3. In an apparatus for the manufacture of sulfuric anhydrid by the contact process, in combination with the contact material, a receptacle for the same containing ingress and egress openings, a holder whereby a cooling medium is held in heat-extracting proximity to said contact material and means whereby the temperature of said medium may be regulated between limits below the decomposing temperature of the sulfuric anhydrid being formed.

4. In an apparatus for the manufacture of sulfuric anhydrid by the contact process, in combination with the contact material, a receptacle for the same containing ingress and egress openings, an inclosure forming a cooling-medium passage adjacent to said receptacle and provided with ingress and egress openings arranged inversely to those of the contact-material receptacle whereby the current of cooling medium flows inversely to the direction in which the gases pass through said contact material.

5. In an apparatus for the manufacture of sulfuric anhydrid by the contact process, in combination with the contact material, a receptacle for the same containing ingress and egress openings, an inclosure forming a passage adjacent to said receptacle and communicating with said ingress-opening and a conduit whereby said passage is supplied with a gas containing sulfur dioxid and oxygen.

6. In an apparatus for the manufacture of sulfuric anhydrid by the contact process, in combination with the contact material, a receptacle for the same containing ingress and egress openings, two conduits supplying gas containing sulfur dioxid and oxygen to said ingress-opening, one of which conduits extends within cooling proximity to said contact material.

7. In an apparatus for the manufacture of sulfuric anhydrid by the contact process, in combination with the contact material, a receptacle for the same containing ingress and egress openings, two conduits supplying gas containing sulfur dioxid and oxygen to said ingress-opening, one of which conduits extends within cooling proximity to said contact material and means whereby the cooling capacity of the current through said conduits is regulated.

8. In an apparatus for the manufacture of sulfuric anhydrid by the contact process, in combination with the contact material, a receptacle for the same containing ingress and egress openings, two conduits supplying gas containing sulfur dioxid and oxygen to said ingress and egress openings, one of which conduits extends within cooling proximity to said contact material and means whereby the temperature of the current passing through said last-mentioned conduit is regulated.

9. In an apparatus for the manufacture of sulfuric anhydrid by the contact process, in combination with the contact material, a receptacle for the same containing ingress and egress openings, an inclosure forming a cooling-medium passage adjacent to said receptacle, a plurality of conduits supplying cooling medium at different points of said passage and valves whereby said conduits are controlled.

10. In an apparatus for the manufacture of sulfuric anhydrid by the contact process, in combination with the contact material, a receptacle for the same containing ingress and egress openings, a temperature-regulator for the gases on the way to said ingress-opening and a conduit supplying the gases to said temperature-regulator and extending within cooling proximity of said contact material.

11. In an apparatus for the manufacture of sulfuric anhydrid by the contact process, in combination with the contact material, a receptacle for the same containing ingress and egress openings, a plurality of conduits through which currents, at different temperatures, of the gases to be converted are supplied to said ingress-opening and means for regulating the relative volume of said currents whereby the temperature of the gases entering the contact material is controlled.

12. In an apparatus for the manufacture of sulfuric anhydrid by the contact process, in combination with the contact material, a receptacle for the same containing ingress and egress openings, a plurality of conduits through which currents, at different temperatures, of the gases to be converted are supplied to said ingress-opening, a mixing-chamber at the union of said currents and means for regulating the relative volume of said currents whereby the temperature of the gases entering the contact material is controlled.

13. In an apparatus for the manufacture of sulfuric anhydrid by the contact process, in combination with the contact material, a receptacle for the same containing ingress and egress openings, an inclosure forming a cooling-medium passage adjacent to said receptacle and a fluid-burner whereby said cooling medium may be heated to a point regulatably below the decomposing temperature of sulfuric anhydrid being formed.

14. In an apparatus for the manufacture of sulfuric anhydrid by the contact process, in combination with the contact material, a receptacle for the same containing ingress and egress openings, an inclosure forming a cooling-medium passage adjacent to said receptacle and means whereby said cooling medium may be heated at a plurality of points along said passage and mechanism whereby the heating capacity of said heating means may be controlled independently of each other.

15. In an apparatus for the manufacture of sulfuric anhydrid by the contact process, in combination with the contact material, a series of receptacles for the same open at the exit ends and a cover $D^3$ common to all of said receptacles at the exit end thereof whereby a receiving-chamber is provided for the sulfuric anhydrid being formed.

16. In an apparatus for the manufacture of sulfuric anhydrid by the contact process, in combination with the contact material, a series of receptacles for the same open at the exit ends and a cover $D^3$ common to all of said receptacles at the exit end thereof whereby a receiving-chamber is provided for the sulfuric anhydrid being formed and means for heating the sulfuric anhydrid in said receiving-chamber.

17. In an apparatus for the manufacture of sulfuric anhydrid by the contact process, in combination with the contact material, a series of receptacles for the same open at the exit ends and a cover $D^3$ common to all of said receptacles at the exit end thereof whereby a receiving-chamber is provided for the sulfuric anhydrid being formed and a cover D common to all of said receptacles at the ingress end thereof whereby a supply-chamber is provided for the gases about to be converted.

18. In an apparatus for the manufacture of sulfuric anhydrid by the contact process, in combination with the contact material, a series of receptacles for the same open at the exit ends and a cover $D^3$ common to all of said receptacles at the exit end thereof whereby a receiving-chamber is provided for the sulfuric anhydrid being formed, and a cover D common to all of said receptacles at the ingress end thereof whereby a supply-chamber is provided for the gases about to be converted and an inclosure $S^2$ common to all of said receptacles whereby the cooling medium is held in contact therewith.

19. In an apparatus for the manufacture of sulfuric anhydrid by the contact process, in combination with the contact material, a receptacle for the same containing ingress and egress openings; the said contact material forming an impediment extending all the way across the passage through the same, and an inclosure forming a cooling-medium passage adjacent to the walls of said receptacle.

20. In an apparatus for the manufacture of sulfuric anhydrid by the contact process, in combination with the contact material, a receptacle for the same containing ingress and egress openings, means whereby the contact material is cooled and means adjacent to the path of the sulfuric anhydrid leaving the contact material whereby the formed sulfuric anhydrid is heated to about 234° centigrade.

21. In an apparatus for the manufacture of sulfuric anhydrid by the contact process, in combination with the contact material, a receptacle for the same containing ingress and egress openings, a conduit leading from a source of gas containing sulfur dioxid and oxygen to said ingress, a cooling-medium holder adjacent to said receptacle and communicating with said ingress, a conduit leading to said cooling-medium holder from a source of gas containing sulfur dioxid and oxygen and a conduit whereby the sulfuric anhydrid is conducted away from the said egress end.

22. In an apparatus for the manufacture of sulfuric anhydrid by the contact process, in combination with the contact material, a receptacle for the same containing ingress and egress openings, a cooling-medium holder adjacent to said receptacle and communicating with said ingress, a conduit leading to said cooling-medium holder from a source of gas containing sulfur dioxid and oxygen, an inclosure forming a passage adjacent to said cooling-medium holder and means whereby the temperature in said passage may be regulated.

23. In an apparatus for the manufacture of sulfuric anhydrid by the contact process, in combination with the contact material, a receptacle for the same containing ingress and egress openings, a cooling-medium holder adjacent to said receptacle and communicating with said ingress, a heating apparatus G, a conduit leading from a source of gas containing sulfur dioxid and oxygen to said heating apparatus, a conduit leading from said heating apparatus to said cooling-medium holder, a conduit whereby sulfuric anhydrid is conducted away from the egress end of said receptacle.

24. In an apparatus for the manufacture of sulfuric anhydrid by the contact process, in combination with the contact material, a receptacle for the same containing ingress and egress openings, a cooling-medium holder adjacent to said receptacle and communicating with said ingress, a conduit from a source of gas containing sulfur dioxid and oxygen, branch conduits from the same to said cooling-medium holder and to said ingress, respectively, and a passage whereby the sulfuric anhydrid is conducted away from said egress.

25. In an apparatus for the manufacture of sulfuric anhydrid by the contact process, in combination with the contact material, a receptacle for the same containing ingress and egress openings, a cooling-medium holder adjacent to said receptacle and communicating with said ingress, a conduit leading to said cooling-medium holder from a source of gas containing sulfur dioxid and oxygen, means whereby the flow of said gas is regulated and means whereby the temperature of the same as it enters said cooling-medium holder is regulated.

26. In an apparatus for the manufacture of sulfuric anhydrid by the contact process, in combination with the contact material, a receptacle for the same containing ingress and egress openings, a conduit leading from a source of gas containing sulfur dioxid and oxygen to said ingress, a cooling-medium holder adjacent to said receptacle and communicating with said ingress, a conduit leading to said cooling-medium holder from a source of gas containing sulfur dioxid and oxygen, a mixer for the gases on their way to said ingress and a passage whereby the sulfuric anhydrid is conducted away from the said egress.

27. In an apparatus for the manufacture of sulfuric anhydrid by the contact process, in combination with the contact material, a plurality of receptacles for the same containing ingress and egress openings, a cooling-medium holder adjacent to said receptacles, baffles in said cooling-medium holder and means whereby the temperature in said cooling-medium holder is regulated below the decomposing temperature of the sulfuric anhydrid being formed.

28. In an apparatus for the manufacture of sulfuric anhydrid by the contact process, in combination with the contact material, a plurality of receptacles for the same containing ingress and egress openings, a cooling-medium holder through which said receptacles extend, a conduit leading from a source of gas containing sulfur dioxid and oxygen to said inclosure, a conduit whereby said inclosure is connected with the ingress ends of said receptacles, a conduit whereby the sulfuric anhydrid is conducted away from said egress end and an inclosure forming an air-space around said holder and means whereby said air-space may be heated.

29. In an apparatus for the manufacture of sulfuric anhydrid by the contact process, in combination with the contact material, a plurality of receptacles for the same containing ingress and egress openings, a cooling-medium holder through which the same extend and communicating with said ingress ends, a conduit leading from a source of gas containing sulfur dioxid and oxygen, a distributer connecting said conduit with said holder and a conduit whereby the sulfuric anhydrid is conducted away from said egress ends.

30. In an apparatus for the manufacture of sulfuric anhydrid by the contact process, in combination with the contact material, a plurality of receptacles for the same containing ingress and egress openings, a cooling-medium holder through which the same extend and which communicates with said ingress, a conduit leading from a source of gas containing sulfur dioxid and oxygen to said holder, baffles whereby said gases are caused to impinge against the surfaces of said receptacles in passing through said holder, a mixer in the path of said gases from said holder to said ingress and a conduit for conducting the sulfuric anhydrid away from said egress.

31. In an apparatus for the manufacture of sulfuric anhydrid by the contact process, in combination with the contact material, a receptacle for the same containing ingress and egress openings, a cooling-medium holder within heat-absorbing proximity thereto, a conduit leading from said cooling-medium holder, a conduit leading from a source of gas containing sulfur dioxid and oxygen to the said ingress; said two conduits passing in heat-transferring proximity whereby the heat absorbed by said cooling medium is transferred to the gases about to undergo the contact.

32. In an apparatus for the manufacture of sulfuric anhydrid by the contact process, in combination with the contact material, a receptacle for the same containing ingress and egress openings, a pocket into which the ingress end of said receptacle projects and a supply-conduit connected with said pocket whereby the gas-supply on its way to said ingress is obliged to travel between the walls of said pocket and said receptacle.

33. In an apparatus for the manufacture of sulfuric anhydrid by the contact process, in combination with the contact material, a receptacle for the same containing ingress and egress openings, an inclosure forming a passage adjacent to said receptacle and communicating with said ingress-opening, a conduit whereby said passage is supplied with a gas containing sulfur dioxid and oxygen and a fluid-burner whereby said gas is heated.

34. In an apparatus for the manufacture of sulfuric anhydrid by the contact process, in combination with the contact material, a receptacle for the same containing ingress and egress openings, an inclosure forming a cooling-medium passage adjacent to said receptacle, a second inclosure forming a second cooling-medium passage adjacent to said first inclosure and means for regulating the temperature of said second cooling-medium passage.

In testimony whereof I have hereunto set my hand in the presence of two subscribing witnesses.

RUDOLF KNIETSCH.

Witnesses:
ERNEST F. EHRHARDT,
BERNHARD C. HESSE.